April 10, 1928.
A. MAUSER
WELDING MACHINE
Filed Dec. 12, 1925
1,665,815
3 Sheets-Sheet 1
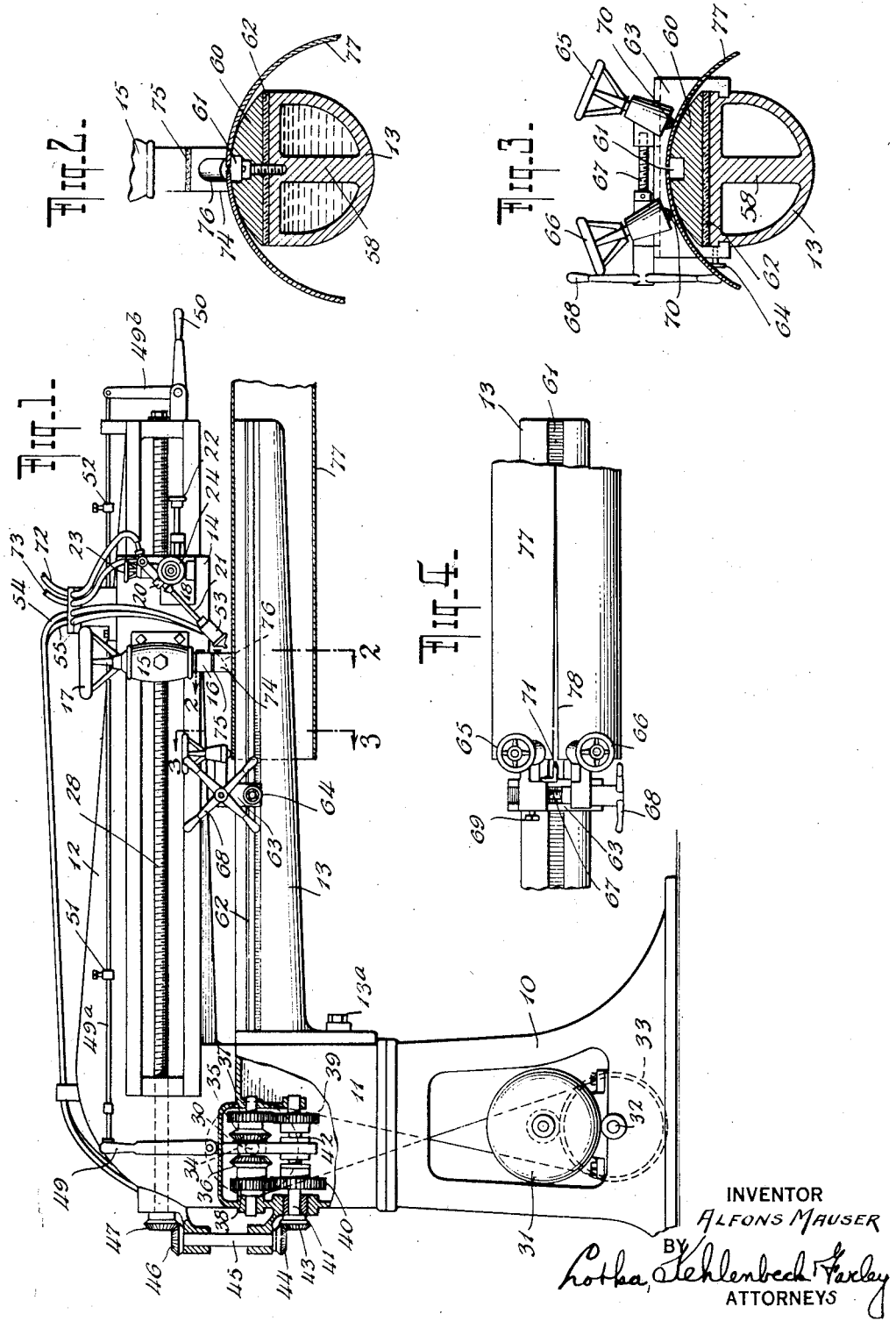
INVENTOR
ALFONS MAUSER
BY
ATTORNEYS

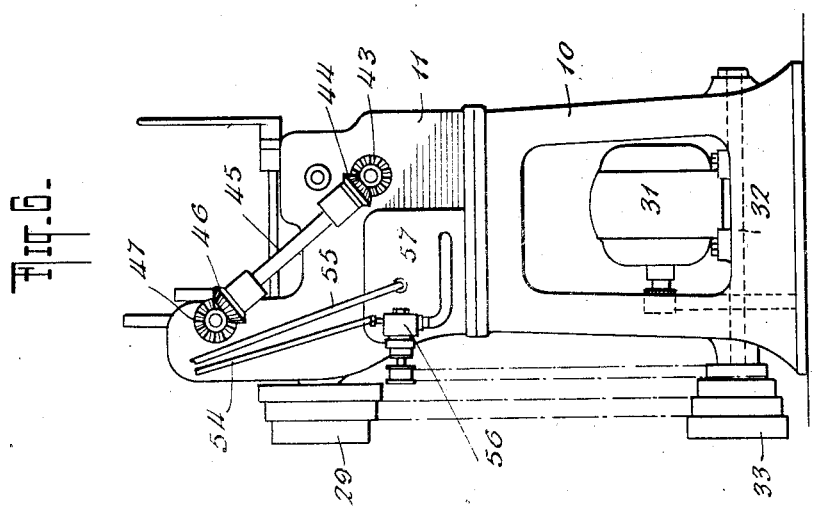
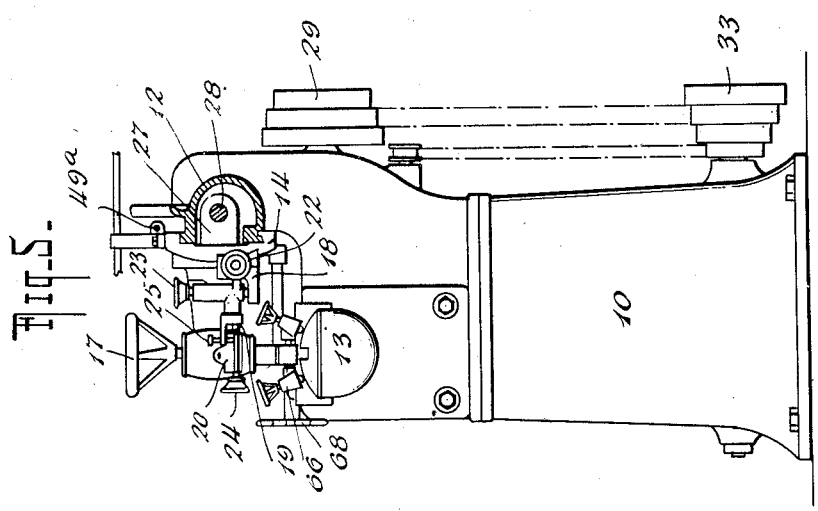

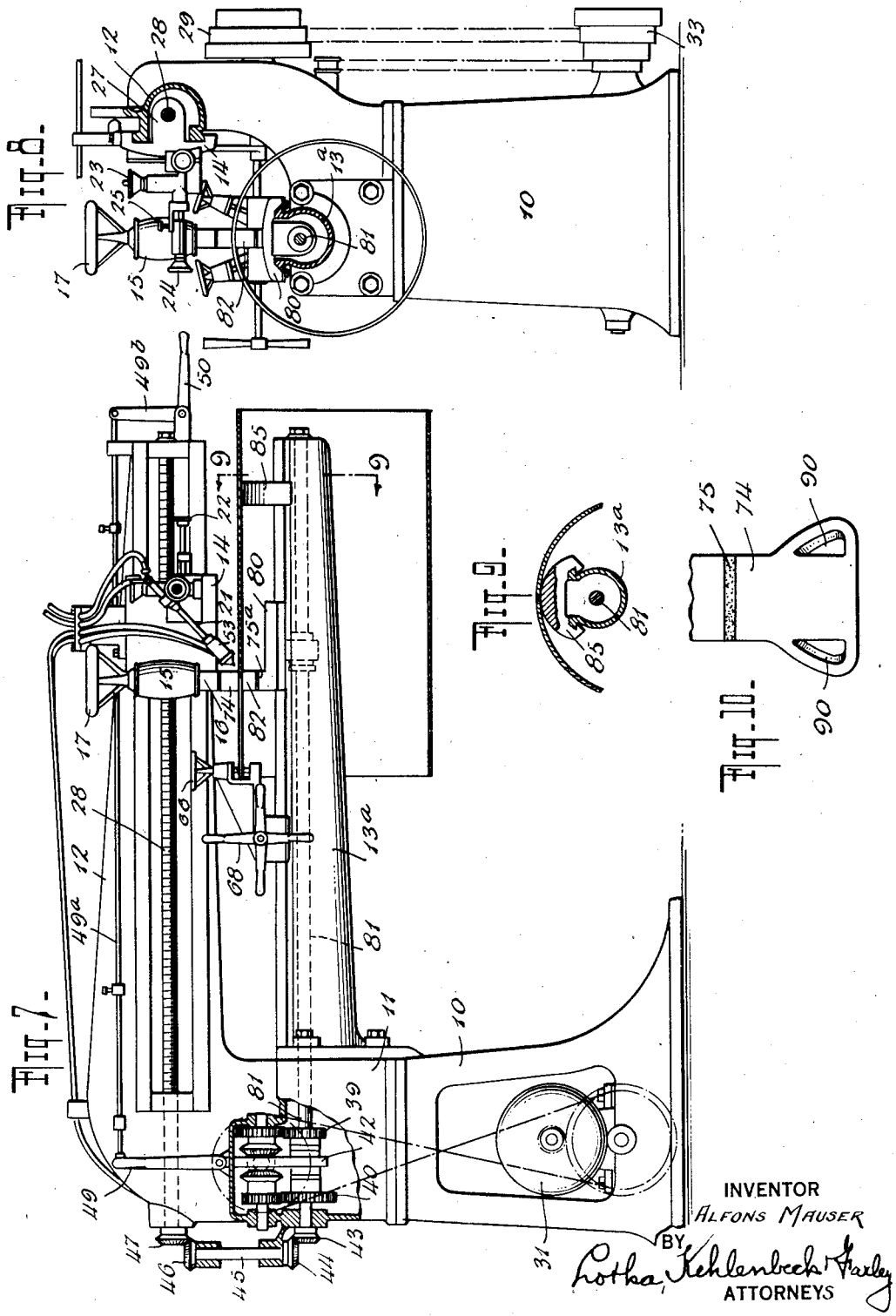

Patented Apr. 10, 1928.

1,665,815

UNITED STATES PATENT OFFICE.

ALFONS MAUSER, OF COLOGNE-MARIENBURG, GERMANY.

WELDING MACHINE.

Application filed December 12, 1925, Serial No. 74,992, and in Germany February 13, 1925.

My present invention relates to welding machines and particularly to machines for the autogenous welding of longitudinal seams on the bodies of barrels, pails and other articles. The object of the invention is to provide a new and improved construction of a welding machine having an automatically actuated power feed for insuring a regular even relative movement of the burner and work for insuring that the work will be welded with greater certainty and efficiency, thereby not only decreasing spoilage of material, but also increasing the output.

Another object is to provide improved means for properly supporting the article during the welding operation, as the latter proceeds from one end of the seam to the other. In machines heretofore employed for the same purpose considerable difficulty has been experienced owing to the fact that there was a tendency of the completed portion of the seam to sag, under the weight of the article, as the burner used for welding approached the unwelded end of the article.

A further object is to provide new and improved mounting for the burner, which mounting includes universal adjustments for quickly and easily regulating the position of the burner relative to the work.

In the preferred construction of my improved machine I provide a stationary support having a relatively small transverse bearing surface extending longitudinally substantially the full length of the machine for supporting the work along the entire length of the seam to be welded, and a movable carriage is provided which is movable longitudinally of said support by power actuated feeding means, or in a different form I provide a stationary and an auxiliary support which is movable in unison with the burner or torch employed for welding and which in conjunction with the stationary support or supports insures a steady and preferably horizontal position of the portion of the article to be welded, during the entire welding operation. The advantage of supporting the weight of the article so as to prevent sagging thereof insures not only a reliable operation without any tendency to deform or injure the joint by the effect of improper support of the article, but a compact construction of the machine and particularly a reduction in the length of the machine.

As a result of the improved manner of supporting the work and the regular even feeding thereof, I am enabled by the use of my machine to dispense with the use of brazing wire for securing a perfect fusion of the weld, thereby greatly decreasing the cost of the welding operation as heretofore carried out. In fact, the savings effected by dispensing with the necessity for using the brazing wire amounts in one year to more than the initial cost of the machine.

Two suitable constructional examples are illustrated in the accompanying drawings, in which Fig. 1 is a side elevation partly in section, of a preferred construction of a machine embodying the principles of my invention; Figs. 2 and 3 are cross sections on lines 2—2 and 3—3 of Fig. 1; Fig. 4 is a detail plan view of the lower arm of the machine shown in Fig. 1; Fig. 5 is an end elevation, partly in section of the front end of the machine; Fig. 6 is a rear elevation; Figs. 7 and 8 respectively are a side elevation and a front elevation similar to Figs. 1 and 5 of a different constructional example; Fig. 9 is a section on the line 9—9 of Fig. 7, and Fig. 10 is a detail of a modified construction of the upper seam presser.

As shown in Figs. 1 to 6 inclusive the machine consists of a supporting standard or base 10 on which is mounted the casting 11 having at the top thereof the horizontally extending top arm 12. Detachably secured to the casting 11 as by the bolts 13ª is a lower arm 13 located, (as clearly shown in Fig. 5) below and to one side of the top arm 12. Slidably mounted for movement longitudinally of the top arm 12, is a carriage 14 to which is secured a bracket 15. Mounted within a screw threaded vertically extending boss of the bracket 15 is an adjusting screw having a pressure member 16 secured to its lower end and a hand wheel 17 secured to its upper end. The carriage 14 is also provided with a laterally projecting stud 19, upon which is pivotally mounted a burner bracket 20, in which is slidably mounted a burner or torch 21.

A number of adjusting devices are provided for the fine adjustment of the burner relatively to the work in any desired direction. These devices include the adjusting screws 22, 23, 24 and 25, the screw 22 serving to move the small auxiliary carriage 18 longitudinally of the work, the screw 23 moving the burner bracket 20 up or down, the screw 24 moving the burner longitudinally of the bracket 20 and the screw 25 (Fig. 5) rotating the burner bracket and burner upon the pivotal support or stud 19.

The carriage 14 is provided with a nut 27 projecting rearwardly into the top arm 12 and a screw 28 engages with said nut for moving the carriage longitudinally of said arm and feeding the burner carried thereby along the work. In order that the feeding of the burner along the work will be steady and continuous, the screw 28 is preferably power actuated. For this purpose I provide a stepped or cone pulley 29 secured to a counter shaft 30 (Fig. 1), which may be driven from any suitable source of power. In the machine illustrated, an electric motor 31 is mounted in the base 10 and drives a main shaft 32, about which and the pulley 29 a driving belt is trained. The inner end of the counter shaft 30 has secured thereto a bevel gear 34 which meshes with a pair of bevel gears 35, 36, rotatably mounted on stub shafts secured in the casting 11, said gears being mounted within a gear housing formed in said casting. Secured to the gears 35, 36 respectively to rotate therewith are spur gears 37, 38, which mesh with gears 39, 40, rotatably mounted on a jack shaft 41. Each of the gears 39, 40 is provided with a clutch face with which the clutch 42, fixed to the shaft for rotation therewith, but slidable longitudinally thereon, is adapted to be engaged for causing the shaft 41 to be rotated in one direction or the other, depending on the position of the clutch. The outer end of the jack shaft 41 carries a bevel gear 43 meshing with a gear 44 on one end of a shaft 45, the other end of which shaft carries a bevel gear 46, meshing with a similar gear 47, secured to the end of the screw 28. A clutch shifting lever 49 is provided for actuating clutch 42 and said lever has connected thereto one end of a rod 49$^a$, which extends along the upper arm 12 and has connected to its other end a bell crank lever 49$^b$, the free arm of which terminates in a hand grip 50. Dogs 51, 52 are adjustably mounted for movement along the rod 49$^a$ and are adapted to be engaged by the carriage 14 to shift said rod and the clutch in the well known manner.

The burner 21 is provided with a water jacket 53 to and from which water, or other cooling medium, is circulated by the flexible tubes 54, 55, which lead respectively to the pump 56 and reservoir 57, mounted on the rear end of the casting 11. The pump 56 which is driven from the main shaft 32 also serves to circulate the cooling medium through the lower arm 13, which, as shown in Figs. 2 and 3 is hollow, and is provided with a central web 58 for defining a pair of water chambers through which the cooling medium is circulated.

The lower arm 13 has secured to its upper face a bed plate 60, having the upper face thereof curved transversely, as shown in Figs. 2 and 3, and provided at its center with a groove or recess 61, extending longitudinally of said arm. Suitable insulating material, as indicated at 62, is provided between the bed plate 60 and the arm 13.

A clamp carrying bracket 63 (Figs. 1, 3 and 4) is dovetailed to the lower arm 13, and is slidable along said arm to any desired adjusted position, a clamping screw 64 being provided to lock said bracket against longitudinal movement. Mounted upon the bracket 63 is a pair of work engaging clamps 65, 66, one of which is movable relatively to the other. As shown, the clamp 66 is movable by means of a screw 67, having a hand wheel 68 secured to its outer end and its inner end threaded into the clamp 65, the latter being held against movement on the bracket 63 by means of the set screw 69 (Fig. 4). Each of the clamps consist of a hand screw, the lower end of which is provided with a swivel button 70, adapted to be screwed against the work to clamp it securely against the bed plate 60 of the lower arm 13. An indicating pointer 71, (Fig. 4) is preferably provided for locating the work centrally of the recess 61 and to serve as a guide for adjusting the movable clamp as required when a seam welding is being performed.

The burner 21 has connected thereto, a pair of flexible tubes 72, 73 for supplying the fuel, as for example, oxygen and acetylene, to the burner.

A presser block 74 is secured to the lower face of the pressure member 16, insulation 75 being interposed between said block and member.

The lower face of the presser block 74 has formed therein a slot or tunnel 76 in alignment with the top of the burner, the purpose of said tunnel being to direct the outer envelope of the burner flame in advance of the main welding flame for preheating the work before it is subjected to the direct heat of said welding flame.

The operation of the machine shown in Figs. 1 to 6 is as follows: The article to be welded, as for example, a tubular or cylindrical barrel, drum, or the like 77, is placed over the lower arm 13 with the edges of the seam to be welded in juxtaposition at the outer end of said arm as shown in Fig. 4, the seam being placed over the center of the recess 61. The clamps 65 and 66 are then actuated to clamp the work at its inner end, so as to leave a gap 78 of gradually increasing width towards said inner end between the meeting edges of the seam, this gap being provided to allow for the expansion of the work due to the heating thereof by the welding flame. The burner carriage 14, which it will be understood will have been run to a position at the outer end of the upper arm, is set to bring the burner tip adjacent to the outer end of the work and the burner is then adjusted to the proper welding position by the screws 22, 23, 24 and 25. In starting the weld, a small amount of brazing wire is used at only the beginning of the seam, it not being necessary with my machine to use such wire for the entire length of the seam as heretofore. After the proper fusion is secured at the outer end of the seam, the clutch 42 is thrown in to cause the gears 36, 38, 40, jack shaft 41, gears 43, shaft 45 and gears 46, 47, to rotate the screw 28 and move the carriage 14 at a regular and steady rate of speed along the arm 12. The expansion of the metal, due to the welding heat, causes the gap 78 left between the meeting edges of the work to close gradually. If, however, too much of a gap or an insufficient gap has been initially provided, the operator may, by turning the handle 68, adjust the movable clamp 66 to decrease or increase the gap as the welding of the seam proceeds.

The dog 51 will be set to engage the carriage as the end of the seam is reached, thereby causing the clutch 42 to be actuated for reversing the travel of the carriage and returning said carriage again to its outer position. In the outward travel of the carriage, the gears 35, 37 and 39 are active; these gears it will be noted being arranged to drive the screw at a faster rate than the gears 36, 38, 40.

In the form shown in Figs. 7 to 9, the lower arm 13ª is provided with a movable supporting and presser block carriage 80, adapted to be moved longitudinally of the arm, in unison with the longitudinal travel of the carriage 14 and burner; the construction of the latter parts being identically the same as shown in Figs. 1 to 6. For the purpose of moving the carriage 80, a screw 81 is substituted for the jack shaft 41; said screw carrying at its inner end the gears 39, 40 and clutch 42, and having the greater part of its length provided with screw threads which engage within co-operating screw threads provided in a depending portion of the carriage 80. The carriage 80 has secured to its upper face a presser block 82, the upper face of which is of the same dimension as the lower face of the upper presser block 74. Insulation 75ª is provided between the presser block and the carriage 80. In order to prevent sagging of the work and distortion thereof as the welding proceeds, I provide in this form of the machine a supporting block 85 having its upper face curved transversely as shown in Fig. 9. The supporting block 85 is dovetailed to the lower arm 13ª and engages with said arm with sufficient friction to hold the block in any position to which it may be adjusted longitudinally thereof, but permitting it to be shoved along said arm to the desired position.

It will be understood that the block 85 will be set so that when the work has reached its inner limit of travel, the outer end of the work will be supported by said block.

In Fig. 10 I have shown a modified construction for directing the outer envelope of the welding flame in advance of the main flame for preheating the work. As shown in this figure, instead of providing the presser block 74 with a tunnel, as shown in Fig. 1, the block is solid, and sheet metal shields 90 are secured to the sides of the block to direct the flame around the sides of the block instead of through a central tunnel.

In both machines illustrated it will be noted that the principle of supporting the work at both ends to prevent sagging thereof is employed and also that the principle of a regular even relative movement of the work and burner is used. In the machine shown in Figs. 1 to 6, the presser block 75 presses the work firmly into contact with the upper face of the bed plate, closely adjacent to the point of application of the welding flame and adjacent to the central recess 61, the latter being provided to permit the metal to flow freely when fused and also to prevent a too direct application of the welding heat on the bed plate. Overheating of the bed plate and lower arm 12 is prevented by the circulation of the cooling medium through the arm. With the machine of Figs. 1 to 6, frictional resistance to the movement of the burner carriage 14 is offered by one presser block only, while in the machine shown in Figs. 7 to 9, both the upper and lower presser blocks offer frictional resistance. In the latter machine it will be noted that the presser blocks lie entirely ahead of the burner so that a free or clear space is left under the work below the point of application of the flame.

It will be understood that various changes and modifications of the constructional details of the examples herein disclosed may be resorted to without departing from the spirit of my invention.

It will be noted that the location of the upper cantilever frame arm to the rear of the lower cantilever arm, in the stepped relationship shown, enables the operator to have a clear vision of the work and a clear working space. Because of the fact that no projecting supports are required with the arm 13, this construction may be used for a greater range of barrel sizes than the lower arm construction shown in Figs. 7 to 9.

I claim:

1. In a longitudinal seam welding machine, a frame having a pair of horizontally extending cantilever arms arranged one above the other in stepped relationship, the lower of said arms being provided with means to support both ends of the article to be welded, and clamping devices to hold said article in welding position; a travelling carriage mounted on said upper arm, driving means to cause said carriage to be moved at a regular even rate of speed, a welding implement mounted on said carriage and a presser block adjacent to said implement to press the edges of the seam to be welded into alignment.

2. In a longitudinal seam welding machine, a pair of cantilever arms spaced one above the other and provided with opposed surfaces to press the edges of the seam to be welded into aligned juxtaposition, a welding implement carried by the upper arm closely adjacent to said surfaces and adjustable to direct its flame against the edges to be welded, clamping devices to secure said edges in juxtaposition and means to cause a regular even relative movement between said implement and article longitudinally of said seam.

3. In a longitudinal seam welding machine, a pair of cantilever arms spaced one above the other, the lower of said arms being provided with a pair of clamps to engage the inner end of the article to be welded and means to support the outer end of said article, means to move one of said clamps relatively to the other to adjust the distance between the opposed edges of the seam to be welded, a traveling carriage, a welding implement mounted on said carriage, and a presser mounted on said carriage adjacent to said implement.

4. A longitudinal seam welding machine as set forth in claim 3, in which the lower of said arms is hollow and means are provided to circulate a cooling medium therethrough.

5. A longitudinal seam welding machine as set forth in claim 3, in which the welding implement comprises an autogenous burner, and the presser is provided with means to direct the outer envelope of the welding flame in advance of the presser for preheating the seam in advance of the application of the main welding flame.

6. In a longitudinal seam welding machine, a frame having a pair of cantilever arms arranged one above the other in offset parallel relationship, the lower of said arms having a combined pressing and supporting surface having a central recess extending longitudinally the full length of said arm, a traveling carriage mounted on the upper arm, means to drive said carriage longitudinally of said arm, a welding implement mounted on said carriage, a pressure block mounted on said carriage adjacent to said implement, means to move said presser block to and from said pressing and supporting surface and a plurality of adjusting devices for setting said implement relatively to the work.

7. A longitudinal seam welding machine as set forth in claim 6, in which the lower cantilever arm is hollow and means are provided for circulating a cooling medium therethrough.

8. A longitudinal seam welding machine as set forth in claim 6, in which the welding implement comprises an autogenous burner, the lower cantilever arm is hollow and means are provided for circulating a cooling medium therethrough, and said presser block is provided with a central tunnel to direct the outer envelope of the welding flame in advance of said presser block to preheat the work before it is subjected to the direct heat of the welding flame.

9. In a longitudinal seam welding machine, a frame having a pair of cantilever arms spaced one above the other, clamping devices to hold the article to be welded stationarily on the lower of said arms, a pair of presser blocks mounted one on each of said arms for movement longitudinally thereof, a welding implement on said upper arm adjacent to said presser blocks, and means for producing a regular even movement of said presser blocks and implement in unison longitudinally of said arms.

10. A welding machine comprising holders for opposite ends of the article to be welded, a welding implement, a support adapted to engage the article on the side opposite to that on which the welding implement is located, said support and said welding implement being mounted to remain in the same position relatively to each other, and mechanism for effecting relative movement of the article on one hand and said support and welding implement on the other hand to weld the article progressively.

11. A welding machine comprising stationary holders for opposite ends of the article to be welded, a welding implement, a support adapted to engage the article on the side opposite to that on which the welding implement is located, said implement and said support being both movable lengthwise in the same direction, and connected mechanisms for shifting said support and said implement in unison.

12. A welding machine comprising holders for the ends of the work, a welding implement, a support adapted to engage the work on the side opposite to that on which the said implement is located, a presser element arranged in registry with said support on the same side as said welding implement, said support, presser, and welding implement, being mounted to remain in the same position relatively to each other during the operation, and mechanism for effecting relative movement of the work on one hand and the support, presser, and welding implement on the other hand to weld the work progressively.

13. A welding machine comprising a frame with fixed projecting spaced arms one of which carries supports for the work, a welding implement movable lengthwise upon the other arm, and an operative connection between said implement and one of said supports, to cause them to move in unison.

14. A longitudinal seam welding machine which includes a welding implement traveling longitudinally along a stationary work piece and a pair of pressure members located in advance of said implement and closely adjacent thereto for holding the work at the welding point, characterized by the provision of a pair of cantilever arms located one above the other, the upper arm carrying said implement and one of said members and the lower of said arms carrying the other of said members, a spindle in each of said arms for moving said implement and members longitudinally, and means for operating said spindles in unison.

15. A longitudinal seam welding machine which includes a welding implement traveling longitudinally along a stationary work piece and a pair of pressure members located in advance of said implement and closely adjacent thereto for holding the work at the welding point, characterized by the provision of a pair of cantilever arms located one above the other, the lower one of said arms carrying the work piece, and spindles journaled in said arms and operatively connected with said pressure members and implement to move them longitudinally.

In testimony whereof I have signed this specification.

ALFONS MAUSER.